June 13, 1939.  S. J. MIKINA  2,162,490

SPEED REGULATOR

Filed Sept. 16, 1937

WITNESSES:
Wm. B. Sellers
Mrs. C. Groome

INVENTOR
Stanley J. Mikina.
BY Ezra W. Savage
ATTORNEY

Patented June 13, 1939

2,162,490

UNITED STATES PATENT OFFICE 2,162,490

SPEED REGULATOR

Stanley J. Mikina, Wilkinsburg, Pa., assignor to Westinghouse Electric & Manufacturing Company, East Pittsburgh, Pa., a corporation of Pennsylvania Application September 16, 1937, Serial No. 164,159

6 Claims. (Cl. 200—52)

My invention relates to speed regulators, and particularly, to regulators of the type employing means for anticipating changes in the speed of a regulated member.

In regulating the speed of a prime mover or electric motor, the accuracy and stability of regulation may be greatly improved if the speed controlling mechanism is responsive not only to changes in the speed of the regulated member but also to changes in acceleration thereof, which acceleration is a measure of the rate of speed change and is independent of the amount of change in speed from a desired value. The acceleration may be employed to initiate a correction action, and when so employed, causes a correction to take place earlier in the cycle in which the speed departs from its desired value than would be the case if the corrective influence were responsive to speed alone. In this way, acceleration, or the rate of change in speed, may be used to anticipate a speed change before the amount of such speed change is appreciable. The anticipatory effect thus secured will compensate for inherent time delays between the initiation of corrective stimuli and the actual application of corrective torques.

It is an object of my invention to provide a speed governor for electrically controlling the speed of a prime mover that is responsive both to the amount of speed change from a desired value, and to the rate of speed change.

Other objects and advantages of my invention will be apparent from the following description of one preferred embodiment of the invention, reference being had to the accompanying drawing, in which.

Figure 1:
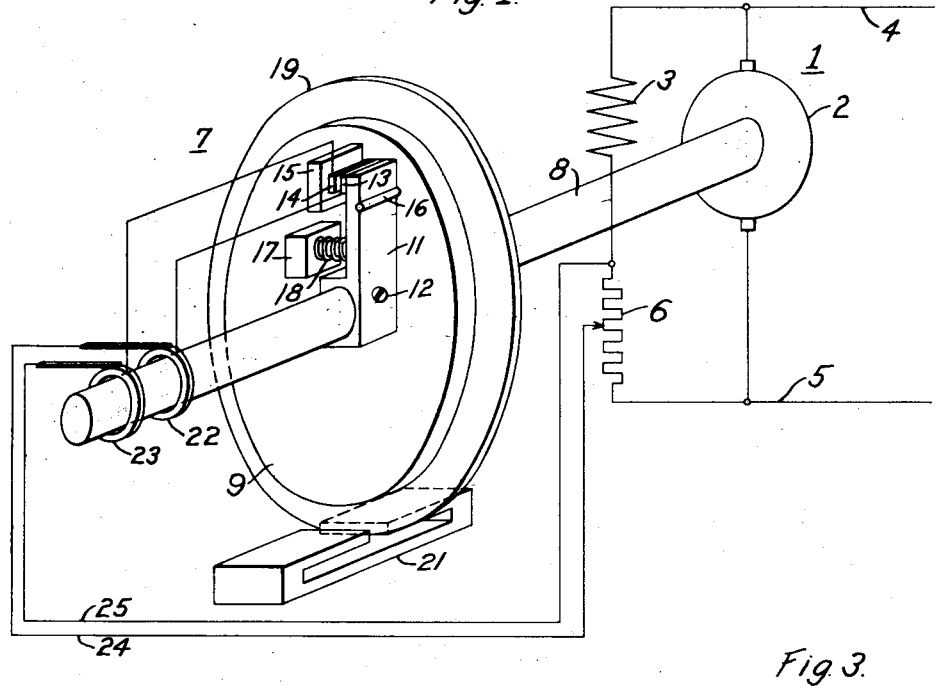
Figure 1 is a diagrammatic view of apparatus and circuits illustrating a preferred embodiment of the invention.

Referring to the drawing, a rotating machine, here illustrated as an electric motor 1, is shown having an armature winding 2 and a field winding 3 that are supplied with electrical energy from a source represented by conductors 4 and 5. A rheostat 6 is illustrated in series with the field winding 3, the effective value of which is varied to control the speed of the motor 1. The speed regulating mechanism 7 is driven by a shaft 8 in accordance with the speed of the motor 1 and comprises a flywheel 9 loosely mounted upon the shaft 8 and driven therefrom through an arm 11 that is fastened to the shaft by a set screw 12, and which carries at its outer end an electrical contact member 13 that is adapted to engage a contact member 14 carried on an abutment 15 of the flywheel 9. A stop 16 is provided on the flywheel 9 to prevent the arm 11 from moving the contact member 13 away from the contact member 14 more than a predetermined amount. An abutment 17 is also provided on the flywheel 9 between which and the arm 11 a spring 18 is inserted, forming a flexible coupling between the arm 11 and the flywheel 9 through which torque is applied from the shaft 8 to the flywheel 9 for driving it.

Figure 3:
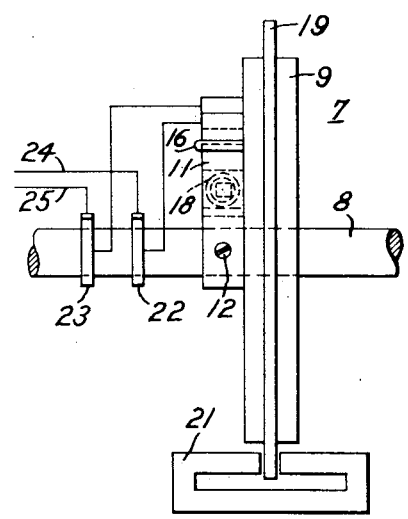
Fig. 3 is a view taken at right angles to Fig. 2.

The outer edge of the flywheel is provided with a flanged portion 19, which, as best shown in Fig. 3, is positioned between the poles of a magnet 21 that may be either a permanent magnet or an electromagnet, for exerting an eddy current drag or resistance to the rotation of the flywheel that is substantially proportional to its velocity. Any equivalent device for exerting a braking force that varies with velocity such as a centrifugal blower, pump, or fan, may be employed. The contact members 13 and 14 may be connected through suitable collector rings 22 and 23, respectively, on the shaft 8 and through conductors 24 and 25, respectively, to control a portion of the field resistor 6.

Figure 2:
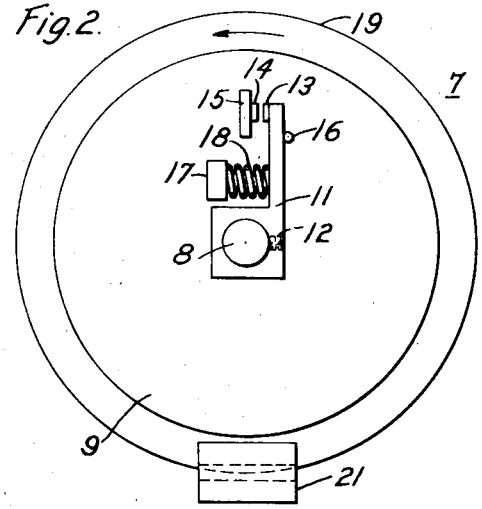
Fig. 2 is a side view of the flywheel and control mechanism employed in the regulator system.

When the motor is started, and assuming that the flywheel 9 is revolved in a counter-clockwise direction, as viewed in Fig. 2, the shaft 8 and arm 11 will apply a driving torque to the flywheel 9, through the spring 18, the spring acting as a flexible torque coupling between the shaft 8 and the flywheel 9. The magnetic drag caused by the magnet 21 varies directly in proportion to the speed. Therefore, as the speed increases, and the resistance to rotation of the flywheel caused by the magnet 21 correspondingly increases, the torque applied to the flywheel 9 through the spring 18 correspondingly increases until it becomes sufficient, at some critical speed, to compress the spring sufficiently to permit the contact member 13 to engage the contact member 14, thus short-circuiting a portion of the resistor 6 to increase the excitation of the motor field 3 and decrease the torque of the motor 1. This decrease in motor torque causes a decrease in the torque applied to the flywheel 9 through the arm 11 and spring 18, so that the spring 18 causes the contact members 13 and 14 to again separate and introduce the resistor 6 in circuit with the field winding 3. The effective value of the resistor 6 is controlled by the repeated engagement and separation of the contact members 13 and 14 upon slight variations in torque from an average value that is determined by the speed at which the torque necessary to drive the flywheel 9 will cause the contacts to close. When the motor is continuously running at the regulated speed the contact movement may be so slight that a hovering condition exists with only enough movement of the contacts to change contact pressure, and not necessarily sufficient movement to effect definite repeated separation and engagement of the contacts.

It will be noted that forces due to both acceleration and speed changes act on one pair of contact members.

The size of the flywheel may be designed to give a suitable inertia torque due to angular acceleration and thus to cause a pressure variation in the contact members 13 and 14 which will anticipate a change in the speed of the motor 1.

The particular speed maintained by the motor 1 is determined by the relation between the force of the spring 18, which acts as a torque coupling between the arm 11 and the flywheel 9, and the magnitude of the eddy current field developed in the rim of the flywheel by the magnet 21. The magnet 21 may be moved toward or from the center of the flywheel to vary the amount of the eddy current drag caused by it and thus vary the speed at which the torque applied to the flywheel through the spring 18 will be just sufficient to compress the spring and permit engagement of the contact members 13 and 14. This adjustment of the desired regulated speed may be made while the motor is operating.

It will be noted that a slight acceleration of the motor 1 before any appreciable increase in the speed of the motor has taken place will cause the contact member 13 to engage the contact member 14, since the inertia of the flywheel 9 causes it to resist a rapid change in speed. Also, a decrease in the speed of the motor 1 when the contact members 13 and 14 are in engagement will not be immediately followed by a corresponding change in the speed of the inertia member 9, thus causing the contact members 13 and 14 to separate and introduce a corrective action prior to an appreciable decrease in motor speed.

It will be noted that the control of the contact pressure as a function of speed is not determined by centrifugal forces, but by forces arising from magnetic drag, viscous friction, blowers, or the like. This simplifies the balancing of the governor or speed regulator to avoid errors caused by the action of gravity on the elements of the governor when rotated about a horizontal axis.

Many changes in the details of the apparatus disclosed will be apparent to those skilled in the art without departing from the spirit of my invention, and I do not wish to be limited otherwise than by the scope of the appended claims.

I claim as my invention:

1. In a speed regulating system, in combination, a motive member the speed of which is being regulated, an inertia member driven thereby, means for applying a retarding force to the inertia member that varies with the speed of the motive member, and means responsive to the torque between said inertia member and said motive member.

2. In a speed regulating system, in combination, a motive member, a rotating inertia member driven thereby through a flexible coupling, means for applying a damping force to said rotating inertia member that is a measure of the speed of the motive member, and means responsive to the driving torque applied to said rotating inertia member.

3. In a speed regulating system for an electric motor wherein the motor speed is controlled by operation of a pair of cooperating contact members, the combination with a shaft driven in accordance with the motor speed, a flywheel loosely mounted rotatively on said shaft, damping means for resisting the rotation of said flywheel, an arm extending from said shaft for driving said flywheel, an abutment on said flywheel and resilient coupling means between said arm and said abutment, a contact member carried by said flywheel and a cooperating contact member carried by said arm.

4. In a regulating system for governing the speed of an electric motor of the class wherein the motor speed is controlled by varying the excitation thereof in response to changes in the relative position of two members, the combination with a shaft driven in accordance with the motor speed, a flywheel loosely mounted rotatively on said shaft, damping means for resisting the rotation of said flywheel, a flexible coupling between said shaft and said flywheel to drive said flywheel by applying a varying torque to said flywheel that is determined by the angular position between said shaft and said flywheel, and means actuated in response to changes in the angular position between said shaft and said flywheel.

5. In a regulating system for governing the speed of an electric motor of the class wherein the motor speed is controlled by varying the excitation thereof, the combination with means for controlling the motor excitation comprising a shaft driven in accordance with the speed of said motor, a flywheel loosely mounted rotatively on said shaft, means for applying a force in opposition to the rotation of said flywheel that varies with the speed thereof, means for driving said flywheel in accordance with the speed of said shaft comprising an arm extending from said shaft, an abutment on said flywheel and biasing means between said arm and said abutment for applying a driving torque to said flywheel in accordance with the angular position between said arm and said abutment, and circuit controlling means actuated in response to the movement of said arm relative to said flywheel.

6. In a speed regulating system for an electric motor of the class wherein motor speed is controlled by the operation of a pair of cooperating contact members, the combination with a shaft driven in accordance with the speed of said motor, a flywheel loosely mounted rotatively on said shaft, means for applying a force in opposition to the rotation of said flywheel that varies with the speed thereof, means for driving said flywheel in accordance with the speed of said shaft comprising an arm extending from said shaft, an abutment on said flywheel and biasing means between said arm and said abutment for applying a driving torque to said flywheel in accordance with the angular position between said arm and said abutment, a contact member carried by said arm and a cooperating contact member carried by said flywheel.

STANLEY J. MIKINA.